United States Patent
Lai et al.

(10) Patent No.: US 12,399,944 B2
(45) Date of Patent: Aug. 26, 2025

(54) RECOMMENDING DOMAINS FROM FREE TEXT

(71) Applicant: Go Daddy Operating Company, LLC, Scottsdale, AZ (US)

(72) Inventors: Wei-Cheng Lai, Cupertino, CA (US); Wenbo Wang, Sunnyvale, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 17/126,822

(22) Filed: Dec. 18, 2020

(65) Prior Publication Data

US 2021/0349959 A1   Nov. 11, 2021

Related U.S. Application Data

(63) Continuation of application No. 16/235,333, filed on Dec. 28, 2018, now abandoned.

(51) Int. Cl.
*G06F 16/9535* (2019.01)
*G06F 16/2457* (2019.01)
*G06F 16/9538* (2019.01)

(52) U.S. Cl.
CPC .... *G06F 16/9535* (2019.01); *G06F 16/24578* (2019.01); *G06F 16/9538* (2019.01)

(58) Field of Classification Search
CPC ........... G06F 16/9535; G06F 16/24578; G06F 16/9538; G06F 16/9536; G06F 16/951
See application file for complete search history.

(56) References Cited

U.S. PATENT DOCUMENTS

| | | | |
|---|---|---|---|
| 2010/0169329 A1* | 7/2010 | Frieder | G06F 16/3346 707/754 |
| 2015/0058330 A1* | 2/2015 | Carroll | H04L 61/3025 707/723 |
| 2016/0171115 A1* | 6/2016 | Jheeta | H04L 61/3025 707/723 |
| 2020/0134015 A1* | 4/2020 | Kumagai | G06F 40/284 |

* cited by examiner

*Primary Examiner* — Allen S Lin
(74) *Attorney, Agent, or Firm* — CHIP LAW GROUP (57) ABSTRACT

Systems and methods of the present invention provide for one or more server computers communicatively coupled to a network and configured to: receive a character string (e.g., a user input or a file content) from a client; match file tokens tokenized from the character string with knowledge base tokens in a database; generate labels/tags for the file tokens according to labels assigned to the knowledge base tokens and a second level domain (SLD) including a token from the file tokens; remove any tokens from the SLD flagged for removal in the database; generate a top level domain (TLD) and one or more domain names combining the SLD and the TLD; score each of one or more generated domain names according to domain name characteristics; and display a list of scored domain names on the client.

20 Claims, 7 Drawing Sheets

File   Edit   Tools

Domain Generation from Relevant Repository Character Strings

Please provide a sentence describing your business, or upload a file to the document repository:

| Lamer Real Estate Group / Costello Realty & Management |

SUBMIT     Upload one or more files

Based on your sentence input, we have generated the following domain name suggestions:

| lamerrealestate.com ▽ | lamerrealestate.us
lamerrealestate.net
lamerrealestate.org
lamerrealestate.online
costello.today
costelloland.com
costellorealty.org

FIG. 3

| File  Edit  Tools     ⇐ ⇒ |
|---|

Domain Generation from Relevant Repository Character Strings

Please provide a website title:                    <u>Upload one or more files</u>

| Hair Extensions \| Fuse Salon \| Coloring \| Keratin \| Dallas Hair Salons |
|---|

Please provide a website description:

| Fuse Salon has over 39 years of combined experience, and our skilled professionals are highly trained in the newest trends, innovative coloring techniques and great styles designed to fit your busy lifestyle. Our full service salon offers everything to indulge yourself with, including: eyebrow threading, waxing, fabulous up do's to makeup for weddings and special occasions. |
|---|

| SUBMIT |
|---|

Based on your website input, we have generated the following domain name suggestions:

| fusesalon.com                  ▽ |
|---|
| fusesalons.com<br>fusesalon.us<br>fusesalon.net<br>blendsalon.net<br>fusebeauty.us |

```
File  Edit  Tools              ⇦ ⇨ ▭

Domain Generation from Relevant Repository Character Strings

Please provide the following:                    Upload one or more files
Business Owner: :   ┌─────────────────────────────┐
                    │ Tina Choi                   │
                    └─────────────────────────────┘

Business Category:  ┌─────────────────────┬───┐
                    │ Real Estate         │ ▽ │
                    └─────────────────────┴───┘
                          ┌────────┐
                          │ SUBMIT │
                          └────────┘
Based on your small business input, we have generated the following domain name suggestions:

┌──────────────────────────────────────┬───┐
│ tinachoi.com                         │ ▽ │
├──────────────────────────────────────┴───┤
│ tinachoiestate.com                       │
│ choiestate.com                           │
│ choiestates.com                          │
│ tinaestate.com                           │
│ tinarealestate.com                       │
│ tina.com                                 │
│ choi.com                                 │
└──────────────────────────────────────────┘
```

RECOMMENDING DOMAINS FROM FREE TEXT

FIELD OF THE INVENTION

The present invention generally relates to the field of domain name recommendation and specifically to the field of recommending customized domain names from one or more character strings received from user input and/or extracted from within one or more electronic documents stored within a repository comprising a collection of electronic or digital files or documents (files).

SUMMARY OF THE INVENTION

The present invention provides systems and methods comprising a server specifically configured to: receive a character string (e.g., a user input or a file content) from a client; match file tokens tokenized from the character string with knowledge base tokens in a database; generate labels/tags for the file tokens according to labels assigned to the knowledge base tokens and a second level domain (SLD) including a token from the file tokens; remove any tokens from the SLD flagged for removal in the database; generate a top level domain (TLD) and one or more domain names combining the SLD and the TLD; score each of one or more generated domain names according to domain name characteristics; and display a list of scored domain names on the client.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Given the utility of domain names in locating resources on the Internet (or within another network), as well as their popularity among Internet users in locating specific website or other Internet resources, users, including businesses and individual users, may desire one or more domain names allowing other users to easily find and access a repository or other collection of files using a domain name (e.g., entering a domain name into an Internet browser to navigate to website files or other resources stored on a hosting server).

These users may have one or more specific domain names that they would prefer to use in association with themselves or their business. Unfortunately, given the utility and popularity of domain names, the domain name(s) desired by the users may be already registered, and therefore unavailable to them.

With their original domain name(s) unavailable to them, these users may struggle to come up with alternative domain names for use with their business and/or website. One alternative is to use available solutions that suggest domain names based on input queries, or based on a collection of short and relevant keywords associated with the business or website.

The disclosed embodiments represent another, alternative solution to suggest available domain names. The disclosed embodiments automatically provide personalized domain name recommendations which are relevant to (i.e., match)

keywords found within a user input and/or other rich amount of free text provided by a user. As non-limiting examples, this rich amount of text may be stored within a data storage in association with a user account, possibly for hosting a website or registering a domain name. The rich amount of text may also include content within one or more corresponding websites hosted and/or published on a hosting server in association with the user account. This example is non-limiting. The rich amount of text may be included within any other repository of files, including word processing documents, documents or other files in portable document format (PDF), video, audio, etc.

Using the rich amount of text within the user input or content (e.g., website content) as an input, the disclosed embodiments automatically suggest domain names from the rich amount of text, thereby consolidating the steps of hosting a website (or other collections of documents), and determining a domain name by which this collection of files will be known.

By providing users a consolidated approach to hosting files and automatically generating and suggesting relevant domain names, the disclosed embodiments provide an improved customer experience by suggesting personalized domain names, which saves users time and energy that would be spent naming these sites or repositories by themselves.

The disclosed embodiments automatically recommend domain names by making use of data provided by the users: 1) during creation, by the user, of a web hosting or other account; and/or 2) mining and making use of the relevant data within the content of files within the repository. The creation of a hosting account may include collecting user input from the user, using a graphical user interface (GUI) and one or more GUI components displayed on a client computer. This user input may include the user's name, email address, physical address (including street address, city, county, state, country, etc.), username, title for the repository or collection of files (e.g., a website title), description of the repository or collection (e.g., a website description), any other sentence of notes associated with the repository, a business category associated with the user's business, etc.

Once the user hosting account is established, the user may upload the files to the repository, or otherwise transfer the files through the network for storage. The disclosed system may then use the provided user input, and/or content within the provided files, to automatically identify the main concept from a collection of identified keyword within the rich amount of text contents, while eliminating other irrelevant concepts. These irrelevant concepts may include, as non-limiting examples, stop words, grammatically incorrect phrases, and terms or phrases common to all websites (e.g., "about us").

Thus, the disclosed system determines how to generate meaningful domain name recommendations based on relevant concepts, which also remove irrelevant keywords or phrases, thereby providing one or more domain names that are shorter and easier for the user to remember.

Figure 1:
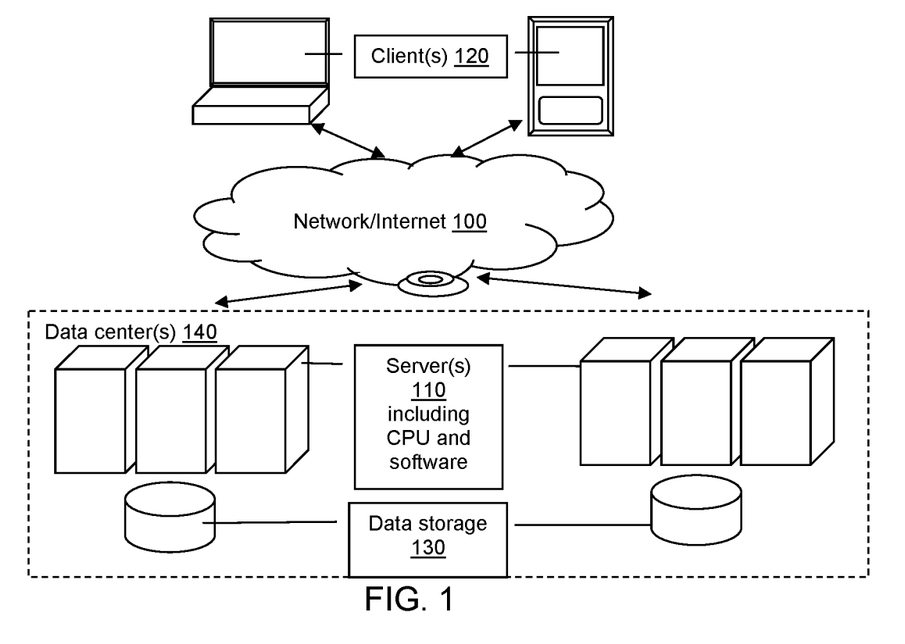
FIG. 1 illustrates a possible system for recommending domains from free text.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
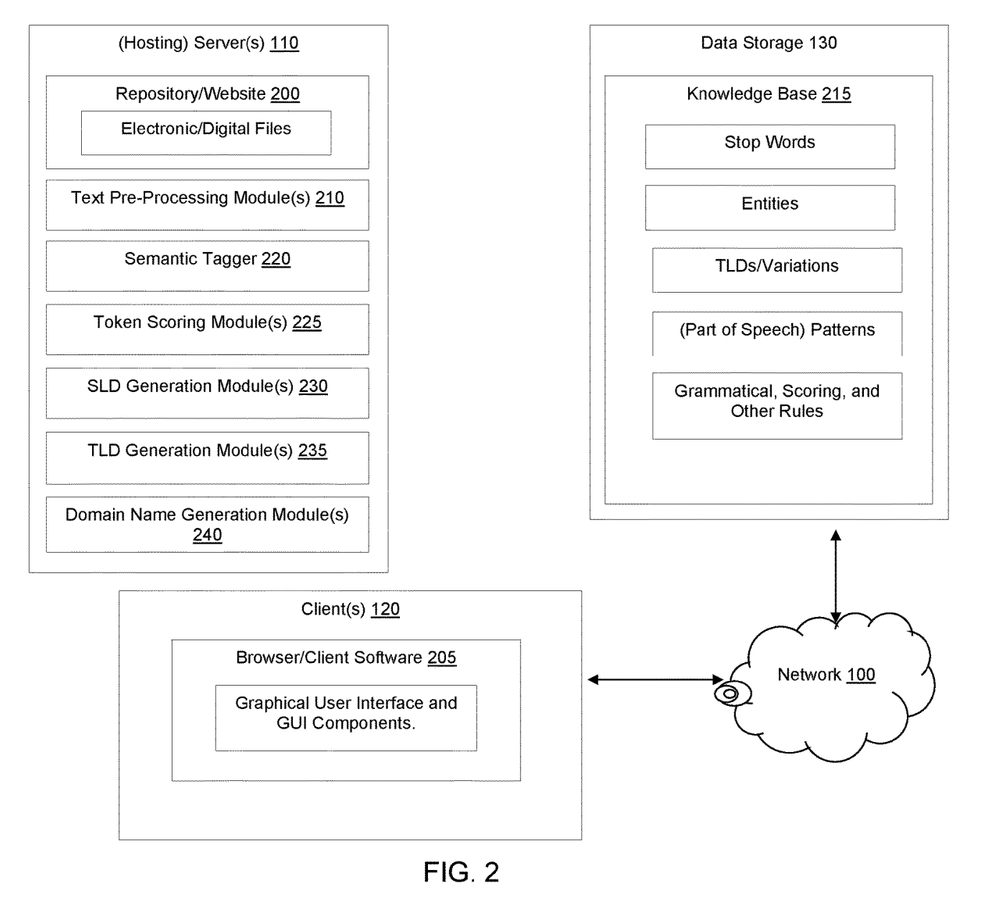
FIG. 2 illustrates a more detailed possible system for recommending domains from free text.

FIG. 2 shows a more detailed example embodiment of an environment for the systems, and for accomplishing the method steps, disclosed herein. As non-limiting examples, all disclosed software modules may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user, or other data, such as authentication information disclosed herein. These transactions, authentication data and/or other data may be stored as data records in data storage 130, each data record including the user id to associate the user with the transaction in data storage 130.

Server 110 may host one or more files for a user within a file repository 200 (e.g., a website hosting directory storing HTML, script, video, audio, PDF documents, or any other electronic or digital files). Server 110 may generate, for display on an Internet browser or other client software 205, a graphical user interface (GUI) including one or more GUI components configured to accept user input data from the user.

In some embodiments, a non-limiting example user may include a customer of a hosting provider. The user may access a hosting provider's website, provide the user account data described below, and upload or otherwise transfer the files over the network 100 to the repository 200. In other non-limiting examples, the user may be using any domain name-related software or service for which the user may desire to generate a recommended domain name. The user may have purchased or registered one of these products, but is unable to find an available domain name relevant to the previously purchased web-related product.

As seen in FIGS. 3-6, the GUI may include data entry forms that accept, from the user, information about the user's account, and additional information about the user and/or the website. As non-limiting examples, this data may include the user's name, email address, physical address (including street address, city, county, state, country, etc.), username, title for the repository or collection of files (e.g., a website title), description of the repository or collection (e.g., a website description), any other sentence of notes associated with the repository, a business name, a business address, a business category associated with the user's business, a small business owner, a small business category, etc.

The user may then transfer the file content over the network for storage in the repository 200, or anywhere else within server 110 and/or data storage 130. As a non-limiting example, the user may establish a website hosting account, input into the GUI and submit all of the information the web hosting service may require, and use any means in the art (e.g., FTP) to upload any hypertext markup language (HTML) files, images, video, audio, and/or other media or content for the website.

After receiving the account data input by the user, as well as the content of the files to be stored in the repository 200 (e.g., the web page content), the disclosed system, possibly software running on server 110, may identify the text within the provided information. This provided information from the account's user input and/or the content within the documents may make up a rich amount of text including one or more character strings, possibly made up of tokens separated by a specific character (e.g., a space character).

Figure 6:
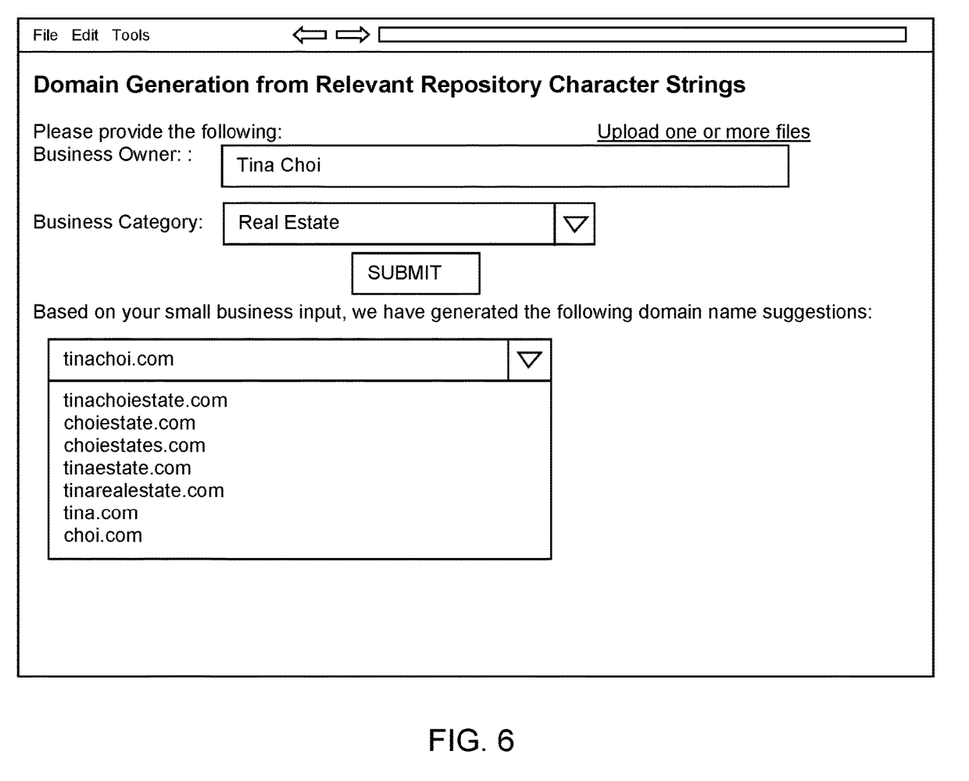
FIG. 6 is a user interface illustrating a possible embodiment for recommending domains from free text.

In some embodiments, the rich amount of text may be derived from the user either from user input received from the GUI presented to accept data for the user account, or from the content of the files uploaded to the repository 200. In some embodiments, such as that seen in FIG. 4, the rich text may be derived from a user input from the GUI including a business name or description. In some embodiments, the user may select, possibly from a dropdown box displayed on the GUI, an industry category for the business, such as seen in FIG. 6.

Figure 3:
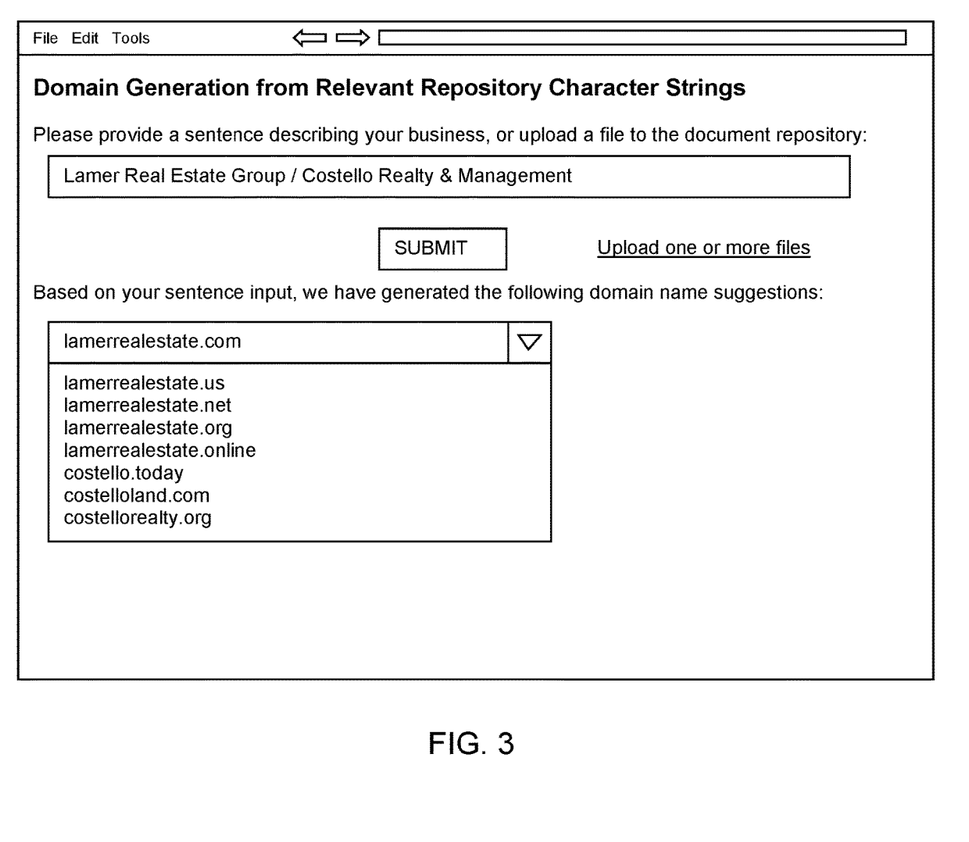
FIG. 3 is a user interface illustrating a possible embodiment for recommending domains from free text.
Figure 4:
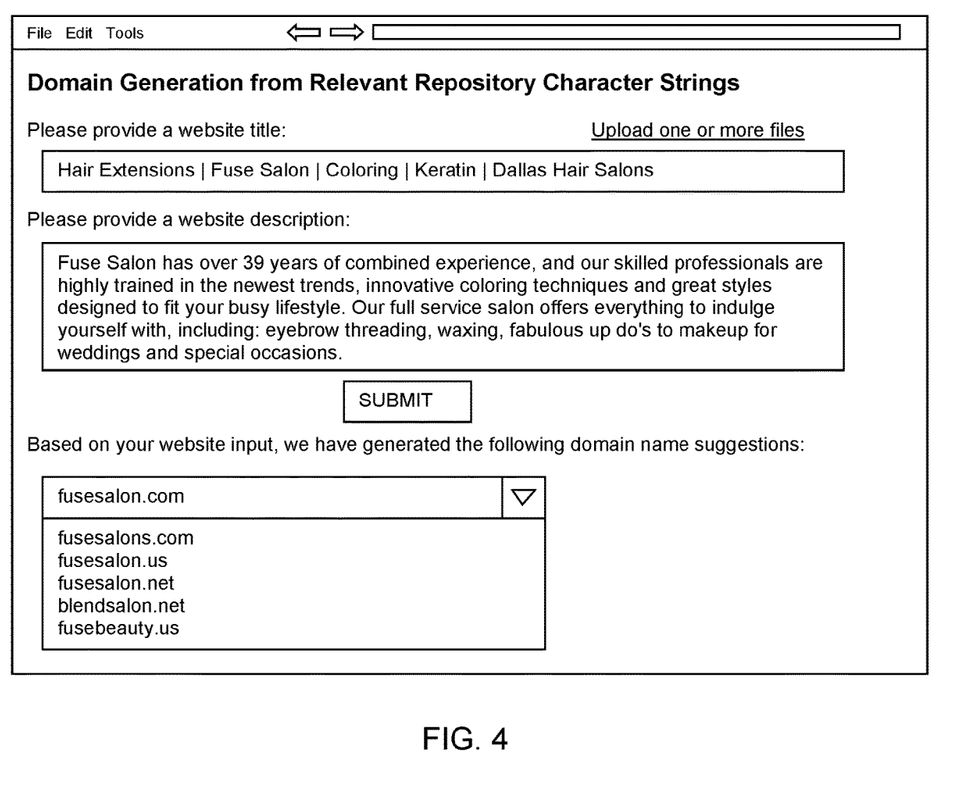
FIG. 4 is a user interface illustrating a possible embodiment for recommending domains from free text.

In some embodiments, such as that seen in FIG. 3, the rich text may be derived from user input in the form of sentences, or other notes relating to the user account, including the business operated by the user and/or any descriptions of the collection of files in the repository 200 (e.g., a website name or description). In embodiments such as that seen in FIGS. 3-4, the GUI may include a "notes" or "comments" section for the description, in which the user may enter notes or comments relating to their user account, or to the collection of files within the repository 200.

In some embodiments, the rich text may be derived from social media posts associated with the user account and/or the collection of files in the repository 200 (e.g., a social media account associated with a website for an individual or business). In some embodiments, the files within the repository 200 may be electronic documents, such as word processing documents or documents in portable digital format (PDF) associated with a website hosted on server(s) 110.

For example, in some embodiments, the files stored in the repository 200 may be web pages for a website hosted on server 110, and the free text may be derived from any content associated with those web pages (e.g., images, audio files, etc.). As needed, in some embodiments, the disclosed embodiments may use optical character recognition (OCR), voice-to-text, etc. to derive any needed character strings within the stored data.

The disclosed system may include one or more text pre-processing software modules 210. In some embodiments, the software may include instructions, stored and executed in a memory and executed by one or more processors within a special purpose server 110 or client 120, customized to perform the method steps described herein, which may be coupled to a memory.

Using any or all of the character strings within the data received, e.g., from the user from account user input or transferred file content, server(s) 110 may perform text pre-processing. This text pre-processing may include any steps to prepare the free text to be analyzed. As non-limiting examples, this analysis may include splitting sentences, tokenizing the character strings, and tagging parts of speech identified within the character strings.

In some embodiments, the text pre-processing software 210 may be configured to split identified sentences. In some embodiments, these identified sentences may include sentences input by users including notes or comments as described above, or may further include any sentences found within any of the content from any of the sources described above.

The text pre-processing software 210 may further perform tokenization of words and other character strings within the sentences, as well as tokenizing any additional content provided by the user or within the stored files. This tokenization may be include analyzing a character string, and breaking apart the text string at a previously identified character to generate a set of tokens consisting of smaller character strings. As a non-limiting example, the text pre-processing software 210 may tokenize a sentence by identifying the specific character (e.g., the space character), and identifying each token as the collection of characters found after each space.

In addition to tokenization, the text pre-processing software 210 may be configured to identify and tag a part of speech for each of the identified tokens or combinations of tokens, such as phrases. In some embodiments, similar to those described in detail below, the text pre-processing software 210 may identify, within a knowledge base 215 or other database, a keyword or other token matching the tokens identified within the input and received free text. The identified keyword or token may have been tagged or otherwise associated in the knowledge base 215 with a specific part of speech. The text pre-processing software 210 may then tag each token identified in the character strings with the part of speech tag identified in its matching keyword within the knowledge base 215.

The software modules may be configured to output the results of the text preprocessing steps disclosed above. The output of these results may be stored in data storage 130 and/or used as input for the software modules described below. In some embodiments, the output of the text preprocessing software 210 results may be stored in the knowledge base 215, as tokens, patterns, parts of speech and/or part of speech patterns.

The disclosed system may include one or more semantic tagger software modules 220. In some embodiments, the software may include instructions, customized to perform the method steps described herein, stored and executed in a memory and executed by one or more processors within server 110 or client 120 which may be coupled to the memory.

The semantic tagger software 220 may receive the output from the text pre-processing software 210 described above, and/or may select data from a knowledge base 215, possibly comprising a database within data storage 130, as described herein. From this data, the disclosed system may retrieve (and if not already tagged, tag) stop words (e.g., is, are), entities (personal or business names, cities, states, countries), TLDs (e.g. .technology), variations of TLDs (e.g., .tech), patterns (e.g., popular website features, such as "about us," or a business name, owner, or category), part of speech patterns (e.g., best bike, an adjective followed by a noun), lexicons, taboo words, etc.

The knowledge base 215 may include one or more stop words. As non-limiting examples, these stop words may include words that are often common to sentences and other character strings, such as articles (e.g., a, an, the), prepositions, (e.g., of, in, by), common state of being verbs (e.g., is, are,), etc.

The knowledge base 215 may further include one or more entities. These entities may include, as non-limiting examples, personal or individual names, names of businesses, product names for the identified business, geographical entities (e.g., cities, states, countries,) etc.

The knowledge base 215 may further include identified TLDs. These TLDs may include, as non-limiting examples, traditional TLDs (.com, .net, .org, .info), gTLDs (e.g., . technology), variations of gTLDs (e.g., .tech), tokens that have previously been tagged as TLDs (e.g., .estate, .group), TLDs that have been identified and associated in the database with one or more tokens that are also relevant to synonyms for the identified one or more tokens (e.g., "real estate" is relevant to gTLDs .property, .properties, and .realtor), TLDs associated with a specific geography (e.g., .us, .Chicago).

The knowledge base 215 may include a plurality of identified patterns. As non-limiting examples, these patterns may include tokens which are typically used together (e.g., "ice cream"), including patterns identified within the knowledge base as frequently used (e.g., "about us" as a feature in websites), and/or combinations of tokens which are more relevant than others, such as personal name or business names.

Figure 5:
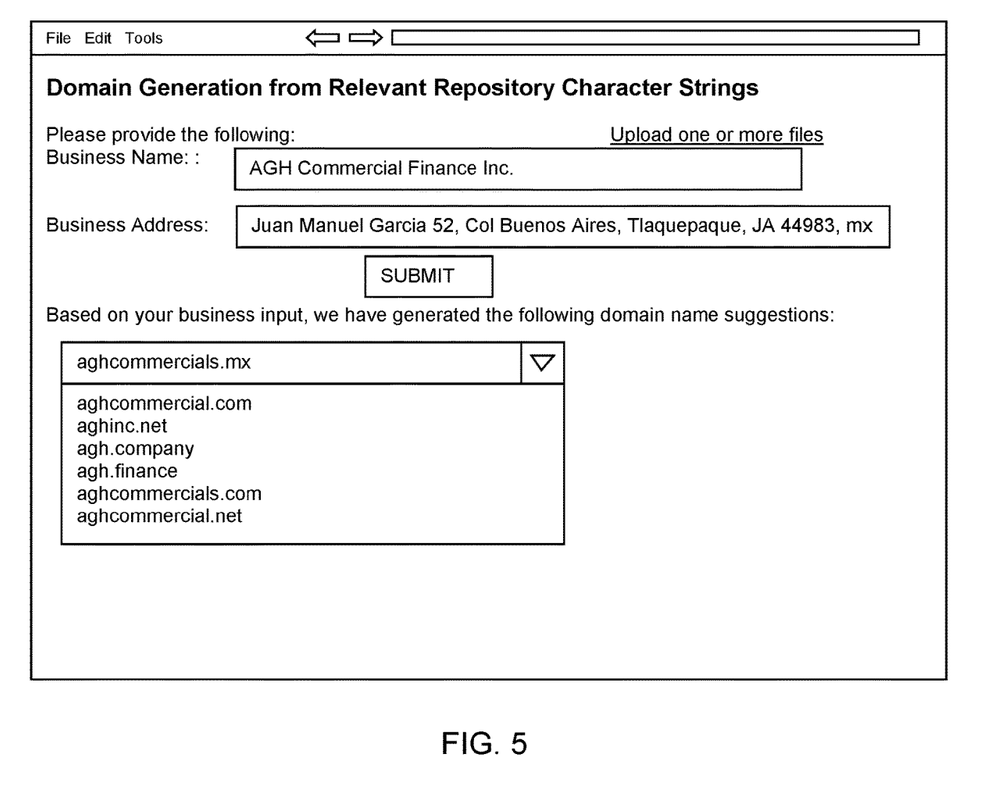
FIG. 5 is a user interface illustrating a possible embodiment for recommending domains from free text.

As a non-limiting example, for a business name AGH Commercial Finanace Inc., as seen in FIG. 5, the combination of "AGH" with "commercial," "finance," or "inc" is more relevant than combining "commercial" with "inc," or "inc" with "finance," and so forth. Additional patterns may include combinations of tokens identified as personal names, business names, product names, industry categories, geography, etc.

As another non-limiting example, the knowledge base 215 may include a parts of speech dictionary defining one or more parts of speech associated with each of the tokens stored in the knowledge base 215. In one non-limiting example, any of the software modules disclosed herein may identify the phrase "best bike." After tokenizing the phrase, the disclosed system may identify a matching word "best" in the knowledge base, which may have been tagged as, or otherwise associated in the database with, the label "adjective," and follow a similar process with the word "bike," identifying it as a noun.

The parts of speech dictionary or other software or stored rules or instructions may further include one or more grammatical rules, which determine grammatically correct combinations of the identified tokens in a correct order according to the grammatical rules for the language associated with the identified tokens.

Thus, any of the identified tokens may be combined together into patterns, according to their part of speech, and the grammatical rules associated with that part of speech. These patterns may include, as non-limiting examples, nouns combined with verbs, adjectives combined with nouns, verbs combined with adverbs, etc.

In some embodiments, the knowledge base 215 may further include a plurality of scores associated with characteristics of the tokens, which may be applied to the generation of domain names, as disclosed below. As non-limiting example, the rules for determining these scores according to token characteristics or other features may be associated in the knowledge base 215 according to, as non-limiting examples, domain name length, a number of tokens in the domain name second level domain, matching personal name or business name, domain name price, number of tokens in an SLD, popularity of a used TLD, etc.

The knowledge base may further include lexicons and taboo words. Lexicons may include any combination of tokens in addition to any associated punctuations, as well as dictionary words and recognizable character strings. These lexicons may be stored or otherwise contained within a lookup table that covering all words, abbreviations, misspellings, and/or punctuations used by the disclosed system. The punctuations and other entries in the lexicon dictionaries may be included as a consideration in generating domain name suggestions. In the non-limiting example seen in FIG. 3, the disclosed system may receive user input identifying a page title as "Lamer Real Estate Group/Costello Realty & Management." In this example, the punctuation may indicate to the disclosed system two distinct noun phrases, which effectively describe the same entity. In essence, the page title is utilized to identify different ways of describing the business. The disclosed system therefore considers punctuations, which provide extra information in order to parse the user input, such as page titles or sentences, into correct phrases that identify specific entities. In some embodiments, the user input may be used by the disclosed system to identify the relationship among and between various noun phrases. The taboo words may include any offensive words. As non-limiting examples, these taboo words may include offensive words associated with pornography, racism, violence, etc.

Using the character strings output from the text pre-processing software 210, the semantic tagger software 220 may retrieve any matching tokens, along with their associated tags and/or any other data associated in the corpus of data stored in the knowledge base 215, and may assign the relevant tag (i.e., the tag associated in the knowledge base with the matching token) to the token identified in the character strings and tokens output from the text pre-processing software 210.

As a non-limiting example, as seen in FIG. 3, the received character string may include "Lamer Real Estate Group/Costello Realty & Management." Using the techniques described above, the semantic tagger software 220 may tag the identified tokens as: Lamer (personal name); Real Estate (entity, gTLD); group (gTLD); Costello (personal name); Realty (gTLD); & (punctuation); Management (gTLD).

The software modules may be configured to output the results of the semantic tagger steps disclosed above. The output of these results may be stored in data storage 130 and/or used as input for the software modules described below.

In some embodiments, the output of the semantic tagger software 220 results may be stored in the knowledge base 215, as tokens, stop words, entities, patterns, parts of speech/part of speech patterns, TLDs or variations, lexicons, taboo words, etc., as well as their respective tags and/or characteristic scoring, as described herein.

The disclosed system may include one or more token scoring software modules 225. In some embodiments, the software may include instructions, customized to perform the method steps described herein, stored and executed in a memory and executed by one or more processors within server 110 or client 120, which may be coupled to the memory.

For each of the tokens, and any associated characteristics or features, identified in the character string received from the user input, the token scoring software 225 may calculate and assign a score to each token or each of the token's characteristics or features, using any technique known for scoring tokens or their characteristics or features, including the methods described below. Once calculated, the token scoring software 225 may store the score, in association with its associated token and/or token characteristics or features, in data storage 130. In some embodiments the token scoring software 225 may use variants of Term Frequency (TF) or Inverse Document Frequency (IDF) techniques to determine the score assigned to each token.

The term frequency technique used in scoring the tokens or each token's characteristics or features may include a term analysis including a determination of frequency of the token (or related concepts) within the data received by the user as user input, or the content within the files in the repository 200 (e.g., within a user's hosted website content). To accomplish this, any combination of the disclosed software modules may analyze any collection of user input and/or content of one or more files uploaded or stored in the repository. After identifying the tokens within the associated character strings, the token scoring software 225 may determine the total number of appearances of that token within each instance of the analyzed data.

As a non-limiting example, for the token "pizza," the token scoring software may analyze 100 separate documents, and determine how many times the term "pizza" appears in each of the 100 documents. If the term "pizza" appears frequently in the documents, it would receive a higher score, and would receive a lower score if it appeared less frequently.

The disclosed system may also utilize a document frequency technique. Continuing the example above, for the token "pizza" the token scoring software 225 may analyze 100 separate documents, and determine how many of them include the token "pizza." If two of the entries (e.g., user inputs or uploaded documents) include the word "pizza," a score and/or result of 2 would result.

The inverse document frequency technique used in scoring the tokens or the tokens' characteristics or features may include a term analysis, specifically a determination used in the removal of those popular words that appear pretty much in almost all electronic documents. As non-limiting examples, these popular words may include stop words such as "the", "that", or "about us" which will fail to add value to any suggested domain names.

The disclosed system may calculate IDF by first, collecting a corpus of data offline for storage in the repository 200. In some embodiments, and/or as a possible alternative, the disclosed system may include a domain name recommendation API, which collects all documents from a database associated with the disclosed system. The disclosed system may then calculate the document frequency of each of the words, phrases, or other tokens appearing in any document from the corpus of data stored in the repository 200. The disclosed system may then identify one or more sets of popular words (i.e., words, phrases, or other tokens with a high document frequency). As a non-limiting example, the IDF approach reveals that the phase "About Us" occurs with high document frequency within such a corpus of data.

The disclosed system, using the corpus of data and the table lookup at runtime, may calculate the final score by multiplying an inverse of the document frequency, multiplied by the term frequency. This calculation may be completed using user input documents exclusively. The multiplication above results in an overall strength, represented by a score, indicating whether the word, phrase, or other token should be a token within a recommended domain name. As a non-limiting example, if the repository includes a corpus of 1000 electronic documents, and the token "pizza" appears in 100 of these documents, the disclosed system may calculate the document frequency to be 100 and may further calculate the inverse document frequency to be is log(1,000,000/100)=log(10,000)=9.21. To extend this non-limiting example, if the disclosed system is crawling a user's webpage and identifies 50 occurrences of the token "pizza" on the user's web page associated with the disclosed system, the disclosed system may calculate the term frequency to be 50. The final score in this example would be TF*IDF=50*9.21=460.5.

The software modules may be configured to output the results of the token scoring steps disclosed above. The output of these results may be stored in data storage 130 and/or used as input for the software modules described below.

In some embodiments, the output of the token scoring software 225 results may be stored in the knowledge base 215 in association with the identified tokens or token characteristics, as described herein.

The disclosed system may include one or more second level domain (SLD) generation software modules 230. In some embodiments, the software may include instructions, customized to perform the method steps described herein, stored and executed in a memory and executed by one or more processors within server 110 or client 120, which may be coupled to the memory.

Using the output from the software module(s) described herein, as supplemented with any additional data stored within data storage 130, the SLD generation software 230 may be configured to generate SLDs using different subcomponents of this output or stored data. Using the techniques described below, the SLD generation software 230 may generate SLDs including meaningful and grammatically correct SLDs from the identified tokenized keywords extracted from the user input and file content received from the user, while simultaneously removing extraneous keywords to suggest shorter domain names that are easier for the user to remember.

As non-limiting examples, this SLD generation may be accomplished by generating, from the identified and scored tokens: all possible n-gram combinations of the received data using correct part-of-speech patterns; all possible n-gram combinations with irrelevant tokens may be removed, possibly using drop-gram techniques, etc.

The tokens in the character strings within the user input and/or uploaded documents in the knowledge base 215 may be combined or otherwise used to generate relevant domain name suggestion candidates using the techniques described in detail below.

As a preliminary step to combining tokens for generating these SLDs, the SLD generation software 230 may determine which of the tokens in the received user input and/or uploaded files are relevant to the received user input or documents including the analyzed character string (e.g., which tokens within a website name, website description, and website content are most relevant to a domain name for the website).

In some embodiments, the SLD generation software 230 may identify the tokens which are most relevant by removing tokens which are irrelevant as a preliminary step. As non-limiting examples, these irrelevant tokens may include the tokens associated in the knowledge base 215 with tags identifying them as stop words such as articles or tokens that are considered unneeded parts of speech, such as frequently used prepositions or state of being verbs, as non-limiting examples.

In some embodiments, the SLD generation software 230 may identify irrelevant tokens by identifying those tokens which are tagged as being in common use among repositories such as websites. As a non-limiting example, many websites include a section or web page titled "about us." However, even though this phrase is popular among websites, it should not be recommended as a domain name for a website or other repository, because the phrase "about us" is irrelevant to the most relevant concepts within the website.

In some embodiments, the SLD generation software 230 may identify irrelevant tokens by identifying those tokens which are grammatically ill-formed, according to the grammatical rules stored in the knowledge base 215. Suggesting domain names that are grammatically ill-formed would be a disservice to the user. Thus, the disclosed embodiments analyze the keywords making up the domain names to recommend grammatically-correct domain names.

The disclosed system may then identify the main concept within the repository by first identifying the one or more keywords that remain after eliminating irrelevant concepts as described above. All remaining terms/tokens, which have been identified within the user input as matching terms or tokens within the repository/knowledge base, may be identified as good candidates to be included within candidate domain names recommended to the user, as described below. The remaining tokens may include, as non-limiting examples, entities, such as person, business/company, or product names or geographic location names, gTLDs and so on. In some embodiments, the relevant remaining keywords may further be identified by determining that the number of remaining relevant keywords outnumber the number of removed irrelevant keywords.

To obtain meaningful and grammatically correct domain name SLDs, the SLD generation software 230 may use n-grams and part-of-speech patterns to generate a first grouping of domain name candidates including n-gram combinations. Generating SLDs from n-grams may include combining n number of tokens as originally received from the user. The SLD generation software 230 may use any of the grammatical tools described above to determine that the n-gram is grammatically correct.

As a non-limiting example as seen in FIG. 3, if the user inputs Lamer Real Estate Group/Costello Realty & Management as a sentence describing a business, the SLD generation software 230 may generate a domain name recommendation by creating an SLD including the trigram lamerrealestate (combined with a TLD such as .com, .net, .org, and .online, as seen in FIG. 3). A business name "AGH Commercial Finance Inc." may likewise result in an SLD using the bigram aghcommercial.

Another method of obtaining meaningful and grammatically correct domain name SLDs includes use of drop-gram techniques to obtain compacted domain name SLDs, and by extension, compacted domain name candidates, where immaterial tokens can be dropped to shorten the names. As non-limiting examples, FIG. 3 includes the application of drop gram techniques, resulting in lamerestate, lamerestategroup, and lamergroup from the received character string Lamer Real Estate Group/Costello Realty & Management. Similarly, as seen in FIG. 5, AGH Commercial Finance Inc. results in aghinc.net, and in FIG. 6, Tina Choi and Real Estate result in tinachoiestate.com, choiestate.com, tinaestate.com, etc.

As noted above, the SLDs generated by the SLD generation software 230 should be grammatically correct. To accomplish this, the SLD generation software 230 may perform part of speech pattern based word/phrase extraction. To accomplish this, the SLD generation software 230 may identify the part of speech for each token as described above, using the part of speech tags and grammar rules previously disclosed.

As a non-limiting example, the SLD generation software 230 may identify tokens within the user input: "This is the best tofu in San Jose." Using the part of speech tags and grammar rules disclosed herein, the SLD generation software 230 may tag/label the tokens as follows: This/Determiner is/Verb the/Determiner Best/Adjective Tofu/Noun in/Determiner San/Noun Jose/Noun. Using these tags and/or labels, the SLD generation software 230 may determine that this example includes a combination adjectives and nouns which make up the phrase, and may determine whether the adjective precedes the noun as required by the grammatical rules. As such, the SLD generation software may generate the following SLDs: thebesttofu, besttofu, thebesttofuinsanjose, and besttofuinsanjose.

In embodiments such as that seen in FIGS. 5-6, the SLD generation software 230 may generate the SLD according to a combination of an identified business name and category or category keyword. In FIG. 6, the user may input, into the GUI on their client device, a name of the business owner (Tina Choi), and may select or otherwise input a business category associated with the business owner (Real Estate). Using this input, the SLD generation software may generate the following SLDs: tinachoiestate; tinachoirealestate; choiestate; choierealestate; tinaestate; tinarealestate.

Using the SLDs generated by any of the SLD generation techniques disclosed herein, the SLD generation software 230 may apply one or more domain name modification or variation techniques, or "spins" to generate additional SLDs. This domain name spinning may include, as non-limiting examples, spinning tokens identified as singular nouns to become plural nouns (and vice versa), and spinning tokens to include synonyms with the original token. To accomplish this, the knowledge base may also include a thesaurus dictionary identifying synonyms for each token in the knowledge base 215 or received from a user.

As non-limiting examples seen in FIG. 6, the SLD generation software 230 may receive input identifying a business owner as Tina Choi, and a selected business category of Real Estate. Using the domain spin techniques described above, the SLD generation software may spin the SLD from choiestate to choiestates (singular to plural spin), or from choiestate to choirealtors (synonym spin).

The software modules may be configured to output the results of the SLD generation steps disclosed above. The output of these results may be used in generating the recommended domain name candidates, and may also be stored in data storage 130 and/or used as input for the software modules described below.

The disclosed system may include one or more top level domain (TLD) generation software modules 235. In some embodiments, the software may include instructions, customized to perform the method steps described herein, stored and executed in a memory and executed by one or more processors within server 110 or client 120, which may be coupled to the memory.

Using the output from the software module(s) described herein, as supplemented with any additional data stored within data storage 130, the TLD generation software 235 may be configured to generate TLDs using different subcomponents of this output or stored data. Using the techniques described below, the TLD generation software 235 may generate TLDs.

As non-limiting examples, this TLD generation may be accomplished by generating, from the identified and scored tokens: all possible traditional TLDs, tagged TLDs, token-relevant TLDs, country code Top Level Domains (ccTLDs), etc.

To obtain meaningful domain name TLDs, the TLD generation software 235 may generate TLDs which are typically associated with domain names, such as .com, .net, .org, .info, etc.

The TLD generation software 235 may further identify, within the knowledge base, TLDs when have been tagged by the semantic tagger software 220, as described above. As a non-limiting example, such tagged TLD generation may include the gTLDs .estate, and .group as TLDs to be used in domain names based on the user input Lamer Real Estate Group/Costello Realty & Management as seen in FIG. 3.

The TLD generation software 235 may further generate TLDs according to relevant gTLDs based on the keywords in the input character string(s). In some embodiments, these relevant gTLDs may be synonyms of tokens identified in the input character string(s). As non-limiting examples, the TLD generation software 235 may generate gTLDs .property, .properties, or .realtor in response to receiving the Lamer Real Estate Group input above, as seen in FIG. 3.

The TLD generation software may also generate TLDs according to one or more ccTLDs or TLDs for cities, states, other municipalities, etc. identified in the user input. As a non-limiting example, if the user were to input a business address of 3570 S. Las Vegas Blvd, Las Vegas, Nev. 89109, the TLD generation software 235 may generate ccTLDs including .vegas and .us, as non-limiting examples.

The software modules may be configured to output the results of the TLD generation steps disclosed above. The output of these results may be used in generating the recommended domain name candidates, and may also be stored in data storage 130 and/or used as input for the software modules described below.

The disclosed system may include one or more domain name generation software modules 240. In some embodiments, the software may include instructions, customized to perform the method steps described herein, stored and executed in a memory and executed by one or more processors within server 110 or client 120, which may be coupled to the memory.

To generate the domain name candidates, the domain name generation software 240 may combine any combinations of the SLDs generated by the SLD generation software 230, as combined with any of the TLDs generated by the TLD generation software 235.

The domain name generation software 240 may then access the appropriate domain name resources (e.g., domain name zone files) to perform a domain name availability check. The domain name generation software may then filter out generated domains that are not purchasable.

The domain name generation software 240 may then order the generated and available domain names according to the highest priority/most relevant domain names generated.

To determine the priority of each domain name, the domain name generation software 240 may identify, within each generated domain name, the tokens, characteristics, and features that make up the domain name. These characteristics and features may be analyzed from several different dimensions.

The domain name generation software 240 may generate a final score for each domain name, based on the score associated in the knowledge base with the identified tokens which make up the domain name, as well as the score associated in the knowledge base 215 with each of the characteristics and/or features analyzed in association with the domain name. As non-limiting examples, these characteristics may include: the length of the domain name; whether the domain name contains a personal name or a business name; the price required to register the domain name; the relative popularity of the TLD used in the domain name; the number of tokens within the generated SLD, etc.

The domain name generation software 240 may then rank all of the generated domain name candidates based on their scores, where the domain names with the highest scores are ranked highest.

Using the ranked domain names, the domain name generation software 240 may create an ordered list of the domain names, with the highest scoring domain name at the top of the list. Using this list, the domain name generation software 240 may generate a GUI component (e.g., a drop down list as shown in FIGS. 3-6) listing the domain names, with the highest scored domain name listed first, and the lowest scored domain name listed last. The GUI component may then be transmitted through the network for display on the GUI on the user's client device 220, and the user may select one or more desired domain names for registration. The software within the disclosed system may then register the domain name.

Figure 7:
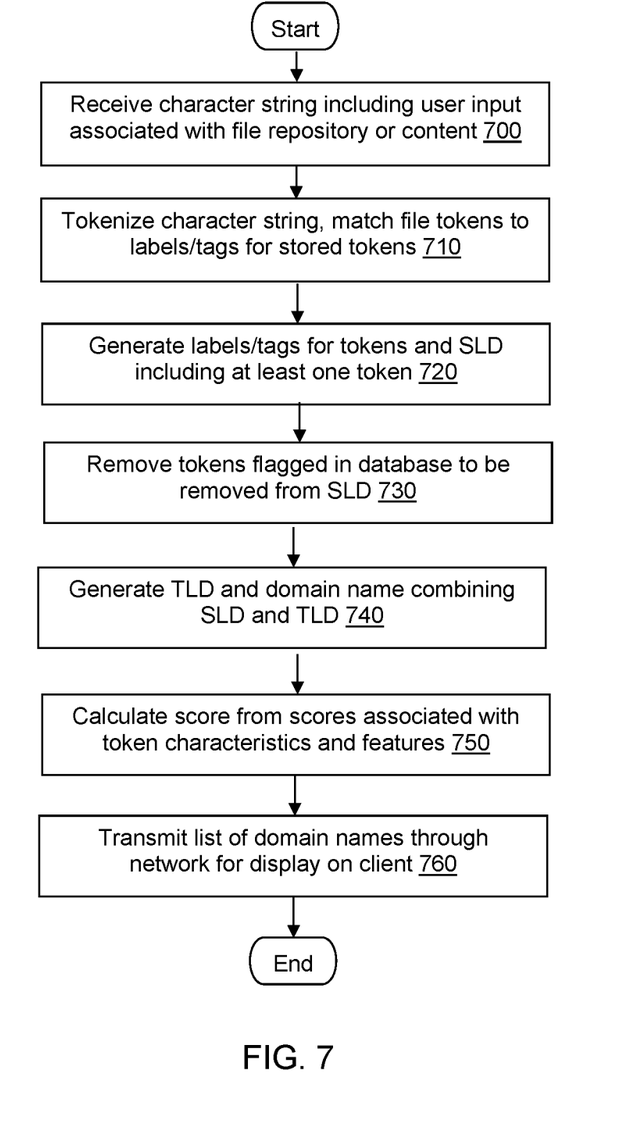
FIG. 7 is a flow diagram illustrating the method steps for a possible embodiment of a method for recommending domains from free text.

Thus, in summary, and as seen in FIG. 7, the disclosed system and associated method steps may include a server, comprising a custom designed special purpose computing device coupled to a network and including at least one processor executing instructions within a memory coupled to the server which, when executed, cause the system to: receive, from a client coupled to the network, a character string comprising: a user input associated with a repository including at least one electronic or digital file; or a content within the at least one electronic or digital file (Step 700).

The system may then tokenize the character string, and match each of a plurality of file tokens tokenized from the character string to a knowledge base token stored in a database coupled to the network (Step 710). The system may then generate: a first label for each of the plurality of file tokens according to a second label associated in the database with a matching knowledge base token; and at least one second level domain (SLD) comprising at least one token from the plurality of tokens (Step 720).

The system may then remove, from the SLD, any of the plurality of tokens flagged in the database to be removed from the SLD (Step 730), and generate at least one top level domain (TLD) and at least one domain name comprising a combination of an SLD from the at least one SLD with a TLD from the at least one TLD (Step 740).

The system may then calculate, for each of the at least one domain name, a domain name score according to a sum of scores associated in the database with at least one feature of each of the at least one domain name (Step 750); and transmit a list of domain names, including the at least one domain name, through the network to be displayed on the client (Step 760).

The steps included in the embodiments illustrated and described in relation to FIGS. 1-7 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a server computing device coupled to a network and comprising:
at least one processor that is programmed to execute instructions stored within a memory of the server computing device so that, when the instructions are executed by the at least processor, the system is programmed to:
receive, from a client computing device coupled to the network, a character string comprising:
a user input associated with at least one of:
a digital repository or
a content within at least one digital file;
wherein the character string is associated with a plurality of speech labels;
tokenize the character string to generate a plurality of file tokens;
wherein each file token in the plurality of file tokens is associated with at least one speech label of the plurality of speech labels;
exclude a first file token of the plurality of file tokens based on at least one speech label associated with the first file token to form a modified set of file tokens that excludes the first file token;
match each file token of the modified set of file tokens to at least one knowledge base token stored in a database coupled to the network to identify a plurality of matched knowledge base tokens within a predetermined period of time,
wherein the database stores a plurality of knowledge base tokens in accordance with a plurality of identified usage patterns,
wherein the plurality of matched knowledge base tokens comprises at least two knowledge base tokens associated with at least one identified usage pattern;
automatically generate, based on the plurality of matched knowledge base tokens and at least one grammar rule, at least:
i) at least one top level domain (TLD) from at least one first label associated with at least one matched knowledge base token of the plurality of matched knowledge base tokens,
ii) at least one second level domain (SLD) from at least one second label associated with the at least one matched knowledge base token of the plurality of matched knowledge base tokens, and
iii) at least one other domain name comprising a combination from the at least one SLD with the at least one TLD;
calculate, for each domain name of the at least one TLD, the at least one SLD, and the at least one other domain name, a domain name score based on a frequency value that corresponds to a number of appearances of a respective matched knowledge base token within the plurality of matched knowledge base tokens within the predetermined period of time, wherein the domain name score is determined based on a plurality of domain name scores, each domain name score corresponding to a respective domain name;
automatically rank each domain name of the at least one TLD, the at least one SLD, and the at least one other domain name based on the domain name score compared to the plurality of domain name scores to generate a ranked list of domain names;
wherein a first ranked domain name has a domain name score that is greater than the domain name score associated with a second ranked domain name;
wherein the first ranked domain name is placed at a higher priority position on a list of ranked domain names than the second ranked domain name on the ranked list of domain names;
select, from the ranked list of domain names, at least one selected domain name having a higher priority placement based on the domain name score within the list of ranked domain names;
dynamically modify the at least one selected domain name via a variation technique based on the user input to generate additional SLDs; and
instruct, through the network, the client computing device to display the at least one selected domain name and an output of the variation technique on the client computing device.

2. The system of claim 1, wherein the at least one first label and the at least one second label comprise:
   at least one stop word, comprising an article, a state of being verb, or a preposition;
   at least one entity-related label comprising a personal name, a business name, a city, a state, or a country;
   at least one relevant TLD, relevant to the at least one knowledge base token, or at least one variation of the at least one relevant TLD; or
   at least one part-of-speech pattern.

3. The system of claim 1, wherein each domain name of the at least one TLD, the at least one SLD, and the at least one other domain name is generated by:
   a first domain name generation technique identifying an n-gram combination of the plurality of knowledge base tokens; or
   a second domain name generation technique utilizing a drop-gram technique.

4. The system of claim 1, wherein each domain name of the at least one TLD, the at least one SLD, and the at least one other domain name is generated using a domain name variation technique comprising:
   a synonym spin;
   a singular noun to plural noun spin; or a plural noun to singular noun spin.

5. The system of claim 1, wherein the instructions further cause the system to generate the at least one TLD comprising at least one of:
   a TLD tagged in the database as relevant to at least one of the plurality of
   knowledge base tokens, a ".com" TLD,
   a ".net" TLD,
   a ".org" TLD,
   a ".info" TLD,
   a country code TLD, or
   a city-related TLD.

6. The system of claim 1, wherein each domain name score is calculated according to at least one dimension of a feature of at least one domain name, and wherein the at least one domain name is ranked based on the domain name score calculated for the at least one domain name.

7. The system of claim 1, wherein each domain name of the at least one TLD, the at least one SLD, and the at least one other domain name are calculated comprising:
   term frequency defining how frequently a term appears in each document; and
   inverse document frequency based on a determination of how many documents contain the term.

8. The system of claim 1, wherein the instructions further comprise program instructions to identify a plurality of tokens that fail to match either the plurality of file tokens or the plurality of knowledge base tokens for display;
   wherein the plurality of tokens that fail to match either the plurality of file tokens or the plurality of knowledge base tokens are flagged as a classification.

9. The system of claim 8, wherein the instructions further comprise program instructions to remove a plurality of flagged tokens from the plurality of tokens.

10. A method, comprising:
    receiving, by a server computing device coupled to a network and at least one processor that is programmed to execute instructions within a memory of the server computing device, from a client computing device coupled to the network, a character string comprising: a user input associated with at least one of: a digital repository a content within at least one digital file;
    wherein the character string is associated with a plurality of speech labels;
    tokenizing, by the server computing device, the character string to generate a plurality of file tokens;
    wherein each file token in the plurality of file tokens is associated with at least one speech label of the plurality of speech labels;
    excluding a first file token of the plurality of file tokens based on at least one speech label associated with the first file token to form a modified set of file tokens that excludes the first file token;
    matching, by the server computing device, each file token of the modified set of file tokens to at least one knowledge base token stored in a database coupled to the network to identify a plurality of matched knowledge base tokens within a predetermined period of time,
    wherein the database stores a plurality of knowledge base tokens in accordance with a plurality of identified usage patterns,
    wherein the plurality of matched knowledge base tokens comprises at least two knowledge base tokens associated with at least one identified usage pattern;
    automatically generating, by the server computing device, based on the plurality of matched knowledge base tokens:
    i) at least one top level domain (TLD) from at least one first label associated with at least one matched knowledge base token of the plurality of matched knowledge base tokens;
    ii) at least one second level domain (SLD) from at least one second label associated with the at least one matched knowledge base token of the plurality of matched knowledge base tokens, and
    iii) at least one other domain name comprising a combination from the at least one SLD with the at least one TLD;
    calculating, by the server computing device, for each domain name of the at least one TLD, the at least one SLD, and the at least one other domain name, a domain name score based on a frequency value that corresponds to a number of appearances of a respective matched knowledge base token within the plurality of matched knowledge base tokens within the predetermined period of time, wherein the domain name score is determined based on a plurality of domain name scores, each domain name score corresponding to a respective domain name;
    automatically ranking, by the server computing device, each domain name of the at least one TLD, the at least one SLD, and the at least one other domain name based on the domain name score compared to the plurality of domain name scores to generate a ranked list of domain names;
    wherein a first ranked domain name has a domain name score that is greater than the domain name score associated with a second ranked domain name;
    wherein the first ranked domain name is placed at a higher priority position on the ranked list of domain names than the second ranked domain name on the ranked list of domain names;
    selecting, by the server computing device, from the ranked list of domain names, at least one selected domain name having a higher priority placement based on the domain name score within the ranked list of domain names;

dynamically modifying, by the server computing device, the at least one selected domain name via a variation technique based on the user input to generate additional SLDs; and instructing, by the server computing device, through the network, the client computing device to display the at least one selected domain name and an output of the variation technique on the client computing device.

11. The method of claim 10, wherein the at least one first label and the at least one second label comprise:
    at least one stop word, comprising:
        an article, a state of being verb, or a preposition;
    at least one entity-related label, comprising: a personal name, a business name, a city, a state, or a country;
    at least one relevant TLD, relevant to the at least one knowledge base token, or at least one variation of the at least one relevant TLD; or
    at least one part-of-speech pattern.

12. The method of claim 10, wherein each domain name of the at least one TLD, the at least one SLD, and the at least one other domain name is generated by:
    a first domain name generation technique identifying an n-gram combination of the plurality of matched knowledge base tokens; or
    a second domain name generation technique utilizing a drop-gram technique.

13. The method of claim 10, wherein each domain name of the at least one TLD, the at least one SLD, and the at least one other domain name is generated using a domain name variation technique comprising:
    a synonym spin;
    a singular noun to plural noun spin; or
    a plural noun to singular noun spin.

14. The method of claim 10, further comprising the step of generating, by the server computing device, the at least one TLD comprising at least one of:
    a TLD tagged in the database as relevant to at least one of the plurality of knowledge base tokens; a ".com" TLD, a".net" TLD,
    a ".org" TLD,
    a ".info" TLD;
    a country code TLD; or
    a city-related TLD.

15. The method of claim 10, wherein each domain name score is calculated according to at least one dimension of a feature of at least one domain name, and wherein the at least one domain name is ranked based on the domain name score calculated for the at least one domain name.

16. The method of claim 10, wherein each domain name of the at least one TLD, the at least one SLD, and the at least one other domain name are calculated comprising:
    term frequency defining how frequently a term appears in each document; and
    inverse document frequency based on a determination of how many documents contain the term.

17. A system, comprising:
    a server computing device coupled to a network and comprising:
        at least one processor that is programmed to execute instructions stored within a memory of the server computing device so that, when the instructions are executed by the at least processor, the system is programmed to:
            receive, from a client computing device coupled to the network, a character string comprising:
                a user input associated with at least one of:
                    a digital repository or
                    a content within at least one digital file;
            wherein the character string is associated with a plurality of speech labels;
            tokenize the character string to generate a plurality of file tokens;
                wherein each file token in the plurality of file tokens is associated with at least one speech label of the plurality of speech labels;
            exclude a first file token of the plurality of file tokens based on at least one speech label associated with the first file token to form a modified set of file tokens that excludes the first file token;
            match each file token of the modified set of file tokens to a knowledge base token stored in a database coupled to the network to identify a plurality of matched knowledge base tokens within a predetermined period of time,
                wherein the database stores a plurality of knowledge base tokens in accordance with a plurality of identified usage patterns, wherein the plurality of matched knowledge base tokens comprises at least two knowledge base tokens associated with at least one identified usage pattern;
                wherein the database stores a plurality of grammar rules;
            automatically generate, based on the plurality of matched knowledge base tokens:
                i) at least one top level domain (TLD) from at least one first label associated with at least one matched knowledge base token of the plurality of matched knowledge base tokens,
                ii) at least one second level domain (SLD) from at least one second label associated with the at least one matched knowledge base token of the plurality of matched knowledge base tokens,
                    wherein the automatically generated SLD complies with the grammar rules of the plurality of grammar rules stored in the database, and
                iii) at least one other domain name comprising a combination from the at least one SLD with the at least one TLD;
            calculate, for each domain name of the at least one TLD, the at least one SLD, and the at least one other domain name, a domain name score based on a frequency value that corresponds to a number of appearances of a respective matched knowledge base token within the plurality of matched knowledge base tokens within the predetermined period of time wherein the domain name score is determined based on a plurality of domain name scores, each domain name score corresponding to a respective domain name;
            automatically rank each domain name of the at least one TLD, the at least one SLD, and the at least one other domain name based on the domain name score compared to the plurality of domain name scores to generate a ranked list of domain names;
                wherein a first ranked domain name has a domain name score that is greater than the domain name score associated with a second ranked domain name;
                wherein the first ranked domain name is placed at a higher priority position on a list of ranked domain names than the second ranked domain name on the ranked list of domain names;
            select, from the ranked list of domain names, at least one selected domain name having a higher priority placement based on the domain name score within the list of ranked domain names;

dynamically modify the at least one selected domain name via a variation technique based on the user input to generate additional SLDs; and instruct, through the network, the client computing device to display the at least one selected domain name and an output of the variation technique on the client computing device.

18. The system of claim 17, wherein the at least one first label and the at least one second label comprise:

at least one stop word, comprising an article, a state of being verb, or a preposition;

at least one entity-related label comprising a personal name, a business name, a city, a state, or a country;

at least one relevant TLD, relevant to the at least one matched knowledge base token, or at least one variation of the at least one relevant TLD; or at least one part-of-speech pattern.

19. The system of claim 17, wherein the at least one TLD further comprises at least one of:

a TLD tagged in the database as relevant to at least one of the plurality of knowledge base tokens; a ".com" TLD, a".net" TLD, a ".org" TLD, a ".info" TLD;

a country code TLD; or a city-related TLD.

20. The system of claim 17, wherein each domain name score is calculated according to at least one dimension of a feature of at least one domain name, and wherein the at least one domain name is ranked based on the domain name score calculated for the at least one domain name.

* * * * *